Patented May 29, 1945

2,376,885

UNITED STATES PATENT OFFICE 2,376,885

WATER TREATING COMPOSITION AND METHOD OF PRODUCING SAME

Fredrick E. Sherwood, Chicago, Ill., assignor to National Aluminate Corporation, Chicago, Ill., a corporation of Delaware No Drawing. Application September 25, 1941, Serial No. 412,305

9 Claims. (Cl. 252—181)

The present invention relates to the treatment of water, and more particularly to a material used for that purpose.

One of the primary objects of the invention is the production of a material, suitable for water treatment, by the action of very concentrated solutions of sodium hydroxide upon various farinaceous or starchy materials under certain definite conditions which will be productive of an end product which is in dry powdered form.

It has been known for some time that starch is of value in the treatment of boiler water, either alone or in combination with various chemicals, and a number of patents have been granted on the use of such starch for the purpose of, for example, preventing the encrustation of boilers or preventing a too adherent scale. One of the difficulties, however, in introducing starch into boilers was that it was believed that it had to be introduced as such; and inasmuch as starch itself is insoluble in water, the starch either had to be boiled first or else, when introduced as a dry material, suspended in water. Thus used, it showed a tendency to settle out in the pretreatment tanks and even to clog the pumps or injectors if an attempt were made to introduce it in water suspension.

Inasmuch as a number of water-treating compositions are often supplied by the manufacturers in the form of briquettes which are placed in the line of flow of the water leading to the boiler or similar apparatus for the purpose of causing the solution in such water of small amounts of treating chemicals, the incorporation of starch with such briquettes is coupled with a number of difficulties, one of them being the relative insolubility of the starch. In cases where powdered materials are employed, the soluble portions thereof will tend to dissolve, while the starch, even though it be initially suspended, will soon settle to the bottom of the treating tank, where it accumulates as a useless sludge and escapes utilization in the process.

While it is known that caustic alkalies may be used to gelatinize starch mainly by the effect of the caustic alkali upon the very thin skin or sac which surrounds the starch granules and which is presumed to be made of some type of amylocellulose, the prior art has invariably made use of comparatively dilute solutions of sodium hydroxide for the avowed purpose of making a viscous paste. Such a paste however is quite unsuitable for use in the treatment of water. If an attempt is made to dry this paste by heat treatment, it produces a hard, horny, comparatively insoluble material which cannot be resuspended in water. Inasmuch as it is the purpose of the present invention to produce a form of starch which will pass into solution even from a briquette containing the same and which will not settle out, it becomes evident that the mere gelatinization of starch by means of sodium hydroxide under the conditions of the prior art will not lead to a useful result. If, on the other hand, starch is boiled with water so as to become gelatinized and the resulting paste is dried, this also leaves a hard and horny material which is not redispersible in water. The problem which had to be solved was how to produce a cold-water soluble material in which the starch was, if anything, but very slightly degraded, and to accomplish this with the minimum amount of expense and operating difficulty.

It has now been found that a material particularly suitable for the treatment of water can be produced by the action of very concentrated sodium hydroxide or similar alkali solutions upon dry starch, followed by the treatment of the resulting product with water-bindive materials which will remove the water from the material without adversely affecting the starch. The removal of this water can be accomplished by either chemical or physical action. Thus the water can be removed by the addition of anhydrous sodium carbonate, the most inexpensive form of which of course is soda ash, or it can be done with anhydrous sodium sulfate or various kinds of anhydrous sodium phosphate, or by means of tannin, various lignin derivatives, sodium bicarbonate, or other materials which will not deleteriously affect the starch but which are capable of binding the water which has been introduced into the mixture. It has been found that, generally speaking, the sodium hydroxide solution should have a concentration of at least 40% NaOH, and it is preferably a concentrated solution such as that obtainable on the market in the form of "50% liquid caustic." In any event, the sodium hydroxide solution should preferably not be weaker than 40% NaOH, for otherwise the mixture of starch and caustic will produce a rubbery tenacious mass which will ball up and be almost unmanageable. It will be realized that ease of manufacture is an important item and that unless the product can be produced in dry form its utilization for its intended purpose becomes very difficult.

The material may consist of, for example, 50 parts of tapioca starch and 45 parts of 50% sodium hydroxide solution which are mixed under conditions affording rapid mixing, from which mixture the water is subsequently abstracted by 100 parts of anhydrous sodium carbonate.

Wide variation is possible in the manufacture, but for purposes of illustration the following specific example is given:

EXAMPLE

In an edge runner mill, provided with the usual agitating and driving means, 50 parts of starch, for example tapioca starch, are placed, and the mill is started operating. There is then comparatively rapidly run into it 45 parts by weight of a 50% caustic soda (sodium hydroxide) solution, the total addition requiring only a short time. This will gelatinize the starch; but, by reason of the relatively high concentration of the sodium hydroxide, it will form a fairly freely flowing material somewhat in the nature of a porridge. Shortly after the addition of the caustic soda there can be added to the material already in the mill about 100 parts by weight of a drying agent such as anhydrous sodium carbonate, which is run in while the mill continues operating until all of it has been introduced, whereafter the mill is run a short time longer to insure thorough blending of all the materials. The time required for adding the caustic soda and drying agent need not consume more than, say, five minutes. The result will be a dry appearing material in rather finely divided form which is the product of the present invention. By virtue of the crushing and sliding action of the edge runner, the product is likely to contain small platelets due to the action of the runner and scraper of the mill. If a powder of uniform size is wanted, the material from the mill may be passed through a regular type of pulverizer—for example, a swing hammer mill—from which the material is directed to an air separator, from which the latter it is discharged in the form of a comparatively free running dry powder. This powder may then be used as such, to be fed into water which is directed to a steam boiler or similar instrumentality, or the powder may be admixed with other chemicals which are used in water treatment. The invention is, however, by no means limited to the addition of these further materials, because the product itself has great utility in water treatment.

As examples of other mixtures, the following table will serve:

Table

[All in parts by weight]

| Starch | NaOH liquor | Bindive materials | | |
|---|---|---|---|---|
| | | $Na_2CO_3$ | Tannin | Lignin derivative |
| 50 (tapioca) | 45 | 100 | | |
| 50 (corn) | 60 | 150 | | |
| 50 | 30 | 75 | | |
| 100 | 125 | 175 | | |
| 50 | 50 | | 125–175 | |
| 50 | 50 | | | 75–100 |
| 50 | 100 | 250 | | |

| Starch | NaOH liquor | Bindive materials | | |
|---|---|---|---|---|
| | | $NaHCO_3$ | $Na_2HPO_4$ (anhydrous) | $Na_3PO_4H_2O$ |
| 50 | 75 | 125 | | |
| 50 | 60 | | 100 | |
| 50 | 50 | | | 75–100 |

From this table it will be noticed that considerable variation in the amounts of materials employed is possible. By the word "tannin" in the table is meant any type of material containing tannin, such as cutch, quebracho, and the like, while the term "lignin derivative" is intended to cover such materials as the relatively pure lignin sulfonic acids as well as the dry sulfite liquor solids obtained by the evaporation of sulfite liquor derived from paper pulp manufacture. Other materials in the table are sodium bicarbonate ($NaHCO_3$), anhydrous disodium monohydrogen phosphate ($Na_2HPO_4$), and the monohydrate of trisodium phosphate ($Na_3PO_4$). In any event, enough of the water-bindive material must be used to produce an apparently dry material. The table is in parts by weight.

The immediate effect of the action of the strong caustic soda liquor is the solution of the material which forms the membrane surrounding each of the starch cells and, very likely, a combination of the alkali with the starch itself. However, by reason of the limited amount of water, no paste or sticky material is obtained; and the substance in the edge runner mill will have the consistency of a porridge rather than a paste. The further addition of the water-bindive material serves to convert this porridge-like material into a solid, which under the attrition of the mill is resolved into a powder, pulverization of which may then be finished in the already mentioned grinding mill.

Sometimes immediately after processing, but more frequently after storage for some time, it will be found that a slight change in the form of the starch takes place, as witnessed by the fact that the color of the starch when stained with an iodine solution is more on the order of a violet than a pure blue, thus indicating that a certain amount of hydrolysis has probably taken place. This hydrolysis, however, extends hardly beyond the amylodextrin stage or, at most, the erythrodextrin stage.

The water-bindive material may be selected from a large number of substances, and the examples given are not intended to limit the invention. It will be considered within its scope so long as the water-bindive material does not exert a deleterious effect either upon the starch or upon the other water-treating chemicals in which the present preparation is employed.

Among the starches which have been found suitable for the purpose are in general any farinaceous or starchy materials such as the various flours, such as wheat flour, rye flour, corn flour, rice flour, potato flour, etc., or the starches derived therefrom—for example, potato starch, rice starch, cornstarch, wheat starch, or any other material of a starchy nature. Obviously, for this purpose, these flours need not be of a quality suitable as a comestible; and therefore any cheap form of starch, or even a waste product from starch manufacture, may be employed; provided of course that the water is not intended for potable purposes. In the table the first two items are tapioca starch and cornstarch, but in the other example the word "starch" is used in its generic sense of farinaceous or starchy material. By the term "dry mass" it is not intended to convey the thought of complete freedom from moisture but rather to indicate that the material is dry in feel and appearance, but not technically anhydrous.

Saving for himself such equivalents as will occur to those skilled in the art into which this invention falls, applicant claims:

1. Process of converting farinaceus material into a product suitable for treating water, which comprises mixing about one part by weight of dry starch with at least 0.6 part by weight of an aqueous solution of sodium hydroxide containing not less than 40% NaOH to solubilize the starch, and then adding a sufficient quantity of a water-soluble, water-bindive material to produce a sensibly dry mass by combining with the water therein contained.

2. Process of producing a solid cold-water-soluble farinaceous product suitable for treating water which comprises gelatinizing about 50 parts by weight of a farinaceous material with about 45 parts by weight of a concentrated aqueous sodium hydroxide solution containing at least 40% by weight of NaOH, and binding the water in the resulting mixture by the addition thereto of an amount of water-soluble water-bindive material at least equal to one and one-half times the weight of the farinaceous material.

3. Process of producing a solid cold-water-soluble farinaceous product suitable for treating water which comprises reacting one part by weight of a farinaceous material with at least 0.6 part by weight of an aqueous caustic soda solution containing at least 40% by weight of NaOH, and binding the water from the resulting mass by adding at least one and one-half parts by weight of a water-soluble water-bindive material to eventuate a dry-appearing material.

4. Process of producing a product suitable for treating water which comprises mixing about one part by weight of starch with at least 0.6 part by weight of an aqueous solution of sodium hydroxide containing at least 40% by weight of NaOH and thereafter mixing the resulting material with at least one and one-half parts by weight of anhydrous sodium carbonate to eventuate a dry mass.

5. A dry-appearing material suitable for treating water comprising a farinaceous material which has been rendered water-soluble by the action thereon of at least 0.6 of its weight of an aqueous solution of sodium hydroxide containing at least 40% of NaOH, in admixture with a water-soluble water-bindive material that has bound the water which had been present in said aqueous solution.

6. A dry-appearing material suitable for treating water which comprises the reaction product of about 50 parts by weight of starch, about 45 parts by weight of a 50% aqueous solution of NaOH, and about 100 parts by weight of anhydrous sodium carbonate.

7. A dry appearing material suitable for treating water comprising starch which has been rendered water-soluble by the action thereon of at least 0.6 of its weight of an aqueous solution of sodium hydroxide containing at least 40% of NaOH, in admixture with hydrous sodium carbonate which while in the anhydrous condition has bound the water present in said aqueous solution.

8. Process of converting farinaceous material into a product suitable for treating water, which comprises mixing about one part by weight of said material with at least 0.6 part by weight of an aqueous solution of sodium hydroxide containing not less than 40% of NaOH to solubilize said material, and then adding a sufficient quantity of a water-soluble, water-bindive material to produce a sensibly dry mass.

9. The process of claim 8 in which the farinaceous material is flour.

FREDRICK E. SHERWOOD.